United States Patent
Yoshimoto et al.

(10) Patent No.: US 8,922,103 B2
(45) Date of Patent: Dec. 30, 2014

(54) SPARK PLUG

(75) Inventors: Osamu Yoshimoto, Inazawa (JP); Tomo-o Tanaka, Aichi (JP); Norihide Kachikawa, Seto (JP)

(73) Assignee: NGK Spark Plug Co., Ltd., Aichi (JP)

( * ) Notice: Subject to any disclaimer, the term of this patent is extended or adjusted under 35 U.S.C. 154(b) by 309 days.

(21) Appl. No.: 13/638,396

(22) PCT Filed: Nov. 26, 2010

(86) PCT No.: PCT/JP2010/006899
§ 371 (c)(1),
(2), (4) Date: Sep. 28, 2012

(87) PCT Pub. No.: WO2011/121689
PCT Pub. Date: Oct. 6, 2011

(65) Prior Publication Data
US 2013/0009538 A1    Jan. 10, 2013

(30) Foreign Application Priority Data

Mar. 31, 2010   (JP) .................. 2010-081033
Sep. 10, 2010   (JP) .................. 2010-203271

(51) Int. Cl.
*H01T 13/32* (2006.01)
*B23K 11/00* (2006.01)
*B23K 35/02* (2006.01)
*B23K 35/30* (2006.01)
*C22C 19/03* (2006.01)
*H01T 13/39* (2006.01)

(52) U.S. Cl.
CPC .............. *H01T 13/39* (2013.01); *B23K 11/002* (2013.01); *B23K 35/0261* (2013.01); *B23K 35/3033* (2013.01); *C22C 19/03* (2013.01); *H01T 13/32* (2013.01)

USPC ........................................... 313/141; 313/144

(58) Field of Classification Search
CPC ......... H01T 13/03; H01T 21/02; H01T 13/32; H01T 13/20; H01T 13/02; H01T 1/24
USPC .................................................. 313/118–145
See application file for complete search history.

(56) References Cited

U.S. PATENT DOCUMENTS

| 8,106,572 B2 * | 1/2012 | Tanaka et al. ................. 313/141 |
| 2007/0159046 A1 | 7/2007 | Yoshimoto et al. |
| 2009/0009048 A1 | 1/2009 | Yoshimoto et al. |
| 2009/0107440 A1 * | 4/2009 | Lykowski et al. ....... 123/169 EL |

FOREIGN PATENT DOCUMENTS

| JP | 2004-247175 A | 9/2004 |
| JP | 2007-165291 A | 6/2007 |
| JP | 2009-16278 A | 1/2009 |

* cited by examiner

*Primary Examiner* — Karabi Guharay
*Assistant Examiner* — Nathaniel Lee
(74) *Attorney, Agent, or Firm* — Sughrue Mion, PLLC

(57) ABSTRACT

A spark plug (1) includes a metallic shell (3) and a ground electrode (27) resistance-welded to the metallic shell (3). The ground electrode (27) is formed from a metal material in which precipitates PR containing at least one of an oxide, an intermetallic compound, etc., are precipitated in grain boundaries. The diameter of an equivalent circle of a precipitate PR having the greatest area is 50 µm or less, and the shortest distance between the precipitates PR is 2 µm or greater. The area occupied by the precipitates PR on the section of the heat-affected zone 27A is equal to 65% or more the area occupied by the precipitates PR (the diameter of an equivalent circle of a precipitate PR having the greatest area) on a section of the normal zone 27B.

8 Claims, 3 Drawing Sheets

(a)

(b)

SPARK PLUG

CROSS REFERENCE TO RELATED APPLICATIONS

This application is a National Stage of International Application No. PCT/JP2010/006899 filed Nov. 26, 2010, and which claims benefit to Japanese Patent Application No. 2010-081033 filed Mar. 31, 2010 and Japanese Patent Application No. 2010-203271 filed Sep. 10, 2010, the contents of which are incorporated herein by reference in their entirety.

TECHNICAL FIELD

The present invention relates to a spark plug for use in an internal combustion engine or the like.

BACKGROUND ART

A spark plug is mounted to, for example, an internal combustion engine (an engine) for igniting an air-fuel mixture contained in a combustion chamber. Generally, a spark plug includes an insulator having an axial bore; a center electrode inserted into a forward end portion of the axial bore; a metallic shell provided externally of the outer circumference of the insulator; and a ground electrode which is resistance-welded to a forward end portion of the metallic shell and forms a spark discharge gap in cooperation with the center electrode. Also, in order to improve corrosion resistance, the metallic shell to which the ground electrode is welded may be subjected to plating, such as zinc plating.

Meanwhile, since the ground electrode is disposed in such a manner as to project toward the center of a combustion chamber, the temperature of the ground electrode becomes very high during use. Accordingly, the ground electrode is apt to suffer a problem that crystals of a metal material used to form the ground electrode coarsen (so-called grain growth), potentially resulting in internal corrosion and a deterioration in durability.

In order to restrict grain growth, there has been proposed a technique for forming the ground electrode from a metal material in which precipitates of an oxide, a nitride, or an intermetallic compound of Y, Zr, etc., are precipitated in grain boundaries (refer to, for example, Patent Documents 1 and 2). According to the technique, in the process of coarsening of crystal grains at high temperature, the precipitates hinder the growth of crystal grains; as a result, grain growth is restrained, whereby internal corrosion or the like can be effectively prevented.

PRIOR ART DOCUMENTS

Patent Documents

Patent Document 1: Japanese Patent Application Laid-Open (kokai) No. 2004-247175
Patent Document 2: Japanese Patent Application Laid-Open (kokai) No. 2009-16278

SUMMARY OF THE INVENTION

Problems to be Solved by the Invention

However, the inventors of the present invention carried out extensive studies and found the following: when the ground electrode is formed from a metal material in which precipitates are precipitated in grain boundaries, in some cases the ground electrode fails to be welded to the metallic shell with sufficient welding strength. In this regard, the inventors of the present invention have studied further and have found that the welding strength can deteriorate for the following reason.

When the ground electrode is welded to the metallic shell, at the time of generation of heat, in the vicinity of a weld interface, precipitates form solid solution, and then in the course of cooling, the precipitates again are precipitated. At this time, the following phenomenon can arise: the precipitates which are expected to precipitate fail to precipitate, and solidify in a state of excessive dissolution (in a state of supersaturation) in a fused matrix. Since precipitates in a supersaturated state are chemically unstable and active, the precipitates occlude hydrogen in the course of plating. As a result, a weld zone embrittles, leading to a deterioration in welding strength.

The present invention has been conceived in view of the above circumstances, and an object of the invention is to provide a spark plug in which the ground electrode exhibits excellent welding strength through prevention of precipitates from falling in a supersaturated state or a like problem.

Means for Solving the Problems

Configurations suitable for achieving the above object will next be described in itemized form. If needed, actions and effects peculiar to the configurations will be described additionally.

Configuration 1: A spark plug of the present configuration comprises a tubular metallic shell and a ground electrode resistance-welded at a proximal end portion to the metallic shell. The ground electrode is formed from a metal material in which precipitates containing at least one of an oxide, a carbide, a nitride, and an intermetallic compound are precipitated in grain boundaries. The spark plug is characterized in that: when a portion of the ground electrode ranging within 100 μm from a weld boundary between the metallic shell and the ground electrode is defined as a heat-affected zone, and a distal end portion of the ground electrode is defined as a normal zone, an area occupied by the precipitates on a section of the heat-affected zone is equal to 65% or more an area occupied by the precipitates on a section of the normal zone, and, as viewed on the section of the heat-affected zone, a diameter of an equivalent circle of a precipitate having a greatest area among the precipitates is 50 μm or less, and a shortest distance between the precipitates is 2 μm or greater.

The normal zone of the ground electrode is a region free from influence of heat associated with resistance welding or the like. Therefore, for example, in the case where a noble metal tip is welded to a distal end portion of the ground electrode, the normal zone of the ground electrode is a region remaining after excluding, from the distal end portion of the ground electrode, a region close to a weld zone of the noble metal tip (i.e., a region influenced by heat associated with welding). Thus, the normal zone of the ground electrode can be, for example, a region located 1 mm or more away from the weld boundary between the metallic shell and the ground electrode and from the weld boundary between the noble metal tip and the ground electrode. Also, "diameter of an equivalent circle of a precipitate" means the diameter of a circle having the same area as the sectional area of the precipitate (the same is applied to the following description).

For implementation of the condition that the area occupied by the precipitates on a section of the heat-affected zone be equal to 65% or more the area occupied by the precipitates on a section of the normal zone, it is good practice for resistance welding to restrain the amount of heat generation in the weld zone (heat-affected zone) and to avoid quick cooling of the weld zone (i.e., to provide time for allowing precipitates to precipitate).

However, if the cooling speed of the weld zone is excessively low, the diameters of precipitates may increase excessively such that the diameter of an equivalent circle of a precipitate having the greatest area among the precipitates on a section of the heat-affected zone exceeds 50 µm. Thus, preferably, while the amount of heat generation in the weld zone is restrained, the weld zone is cooled at some cooling speed, for example, by natural cooling or the like.

Configuration 2: A spark plug of the present configuration is characterized in that, in the above configuration 1, the area occupied by the precipitates on the section of the heat-affected zone is equal to 85% or more the area occupied by the precipitates on the section of the normal zone, and, as viewed on the section of the heat-affected zone, the diameter of an equivalent circle of the precipitate having the greatest area among the precipitates is 50 µm or less, and the shortest distance between the precipitates is 8 µm or greater.

Configuration 3: A spark plug of the present configuration comprises a tubular metallic shell and a ground electrode resistance-welded at a proximal end portion to the metallic shell. The ground electrode is formed from a metal material in which precipitates containing at least one of an oxide, a carbide, a nitride, and an intermetallic compound are precipitated in grain boundaries. The spark plug is characterized in that: when a portion of the ground electrode ranging within 100 µm from a weld boundary between the metallic shell and the ground electrode is defined as a heat-affected zone, and a distal end portion of the ground electrode is defined as a normal zone, a diameter of an equivalent circle of a precipitate having a greatest area among the precipitates on a section of the heat-affected zone is equal to 85% or more a diameter of an equivalent circle of a precipitate having a greatest area among the precipitates on a section of the normal zone, and, as viewed on the section of the heat-affected zone, the diameter of the equivalent circle of the precipitate having the greatest area among the precipitates is 50 µm or less, and a shortest distance between the precipitates is 2 µm or greater.

For implementation of the condition that the diameter of an equivalent circle of a precipitate having the greatest area among the precipitates on the section of the heat-affected zone be equal to 85% or more the diameter of an equivalent circle of a precipitate having the greatest area among the precipitates on a section of the normal zone, it is good practice for resistance welding to restrain the amount of heat generation in the weld zone and to avoid quick cooling of the weld zone.

Configuration 4: A spark plug of the present configuration is characterized in that, in the above configuration 3, as viewed on the section of the heat-affected zone, the diameter of the equivalent circle of the precipitate having the greatest area among the precipitates is 50 µm or less, and the shortest distance between the precipitates is 8 µm or greater.

Configuration 5: A spark plug of the present configuration is characterized in that, in any one of the above configurations 1 to 4, as viewed on the section of the heat-affected zone, the shortest distance between the precipitates is 30 µm or less.

Configuration 6: A spark plug of the present configuration is characterized in that, in any one of the above configurations 1 to 5, the precipitates (PR) contain any one element of neodymium (Nd), yttrium (Y), and zirconium (Zr).

Effects of the Invention

According to the spark plug of configuration 1, since the ground electrode is formed from a metal material in which precipitates containing at least one of an oxide, a carbide, a nitride, and an intermetallic compound are precipitated in grain boundaries, the ground electrode can be improved in corrosion resistance and durability.

On the other hand, since a metal material used to form the ground electrode contains precipitates, the ground electrode involves a concern about deterioration in welding strength. However, according to the spark plug of configuration 1, the area occupied by the precipitates on a section of the heat-affected zone is equal to 65% or more the area occupied by the precipitates on a section of the normal zone. That is, configuration 1 is determined such that precipitates are deposited sufficiently in the heat-affected zone. Therefore, precipitates can be more reliably prevented from falling in a supersaturated state in the heat-affected zone. As a result, embrittlement of the weld zone (the heat-affected zone and its vicinity) associated with a plating process can be effectively restrained.

Meanwhile, when cracking occurs originating from a precipitate, cracking propagates between precipitates along grain boundaries. At this time, when the distance between precipitates is excessively small, cracking propagates more quickly; as a result, strength may deteriorate. In this regard, according to the spark plug of configuration 1, as viewed on a section of the heat-affected zone, the diameter of an equivalent circle of a precipitate having the greatest area among precipitates is 50 µm or less, and the shortest distance between precipitates is 2 µm or greater. That is, since configuration 1 is determined such that the distance between precipitates does not become excessively small, the propagation speed of cracking can be effectively lowered. As a result, deterioration in strength of the heat-affected zone can be more reliably prevented.

As described above, according to the spark plug of configuration 1, embrittlement of the heat-affected zone can be restrained, and deterioration in strength of the heat-affected zone can be more reliably prevented through reduction of the propagation speed of cracking. As a result, the welding strength of the ground electrode can be drastically improved.

The spark plug of configuration 2 is configured such that precipitates are precipitated in a larger amount in the heat-affected zone and is configured to ensure a larger distance between precipitates. Therefore, precipitates can be more reliably prevented from falling in a supersaturated state in the heat-affected zone, and the propagation speed of cracking can be more effectively lowered.

The spark plug of configuration 3 is configured such that the diameter of an inscribed equivalent circle of a precipitate having the greatest area among the precipitates on a section of the heat-affected zone is equal to 85% or more the diameter of an equivalent circle of a precipitate having the greatest area among the precipitates on a section of the normal zone. That is, configuration 3 is determined such that precipitates are precipitated sufficiently in the heat-affected zone. Thus, precipitates can be more reliably prevented from falling in a supersaturated state in the heat-affected zone. As a result, configuration 3 yields actions and effects similar to those yielded by the above configuration 1.

According to the spark plug of configuration 4, since a greater distance between precipitates is ensured, the propagation speed of cracking can be more effectively lowered. As a result, the welding strength of the ground electrode can be further improved.

According to the spark plug of configuration 5, since the distance between precipitates is specified to a sufficiently small value of 30 µm or less, coarsening of crystal grains can be more reliably restrained. As a result, internal corrosion in and deterioration in durability of the heat-affected zone can be more reliably prevented.

According to the spark plug of configuration 6, since precipitates contain any one element of Nd, Y, and Zr, grain growth in the ground electrode can be more effectively restrained. As a result, corrosion resistance or the like of the ground electrode can be further improved.

MODES FOR CARRYING OUT THE INVENTION

Figure 1:
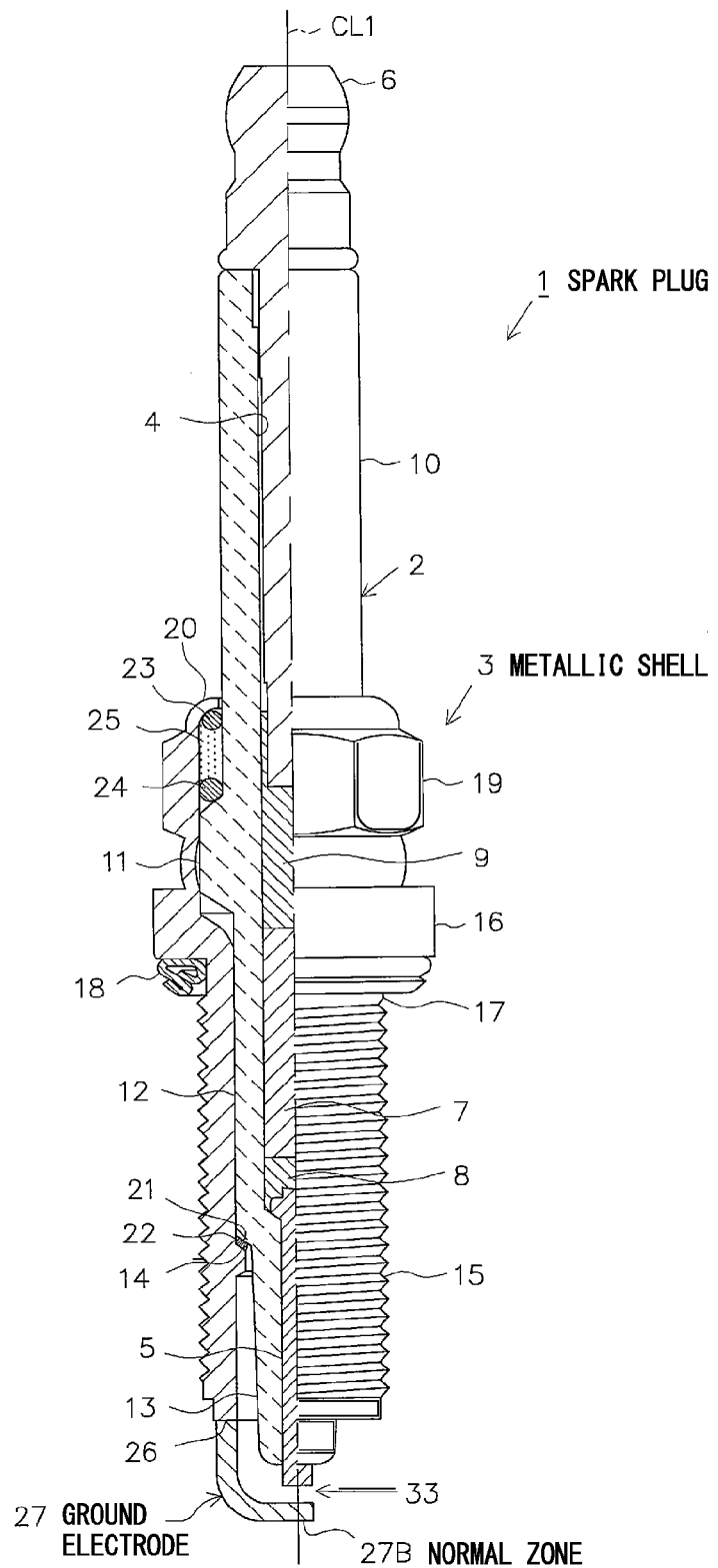
FIG. 1 Partially cutaway front view showing the configuration of a spark plug.

An embodiment of the present invention will next be described with reference to the drawings. FIG. 1 is a partially cutaway front view showing a spark plug 1. In FIG. 1, the direction of an axis CL1 of the spark plug 1 is referred to as the vertical direction in the drawing. In the following description, the lower side of the spark plug 1 in FIG. 1 is referred to as the forward side of the spark plug 1, and the upper side as the rear side.

The spark plug 1 includes a ceramic insulator 2 and a tubular metallic shell 3, which holds the ceramic insulator 2 therein.

The ceramic insulator 2 is formed from alumina or the like by firing, as well known in the art. The ceramic insulator 2, as viewed externally, includes a circular columnar rear trunk portion 10 formed on the rear side; a large-diameter portion 11, which is located forward of the rear trunk portion 10 and projects radially outward; an intermediate trunk portion 12, which is located forward of the large-diameter portion 11 and is smaller in diameter than the large-diameter portion 11; and a leg portion 13, which is located forward of the intermediate trunk portion 12 and is smaller in diameter than the intermediate trunk portion 12. Additionally, the large-diameter portion 11, the intermediate trunk portion 12, and most of the leg portion 13 of the ceramic insulator 2 are accommodated within the metallic shell 3. A tapered, stepped portion 14 is formed at a connection portion between the intermediate trunk portion 12 and the leg portion 13. The ceramic insulator 2 is seated, at the stepped portion 14, on the metallic shell 3.

Furthermore, the ceramic insulator 2 has an axial bore 4 extending therethrough along the axis CL1. A center electrode 5 is fixedly inserted into a forward end portion of the axial bore 4. The center electrode 5 is formed from a nickel (Ni) alloy and assumes a rodlike (circular columnar) shape as a whole. A forward end surface of the center electrode 5 is formed flat and projects from the forward end of the ceramic insulator 2.

Also, a terminal electrode 6 is fixedly inserted into the rear side of the axial bore 4 in such a manner as to project from the rear end of the ceramic insulator 2.

Furthermore, a circular columnar resistor 7 is disposed within the axial bore 4 between the center electrode 5 and the terminal electrode 6. Opposite end portions of the resistor 7 are electrically connected to the center electrode 5 and the terminal electrode 6 via electrically conductive glass seal layers 8 and 9, respectively.

Additionally, the metallic shell 3 is formed in a tubular shape from a low-carbon steel or a like metal. The metallic shell 3 has, on its outer circumferential surface, a threaded portion (externally threaded portion) 15 adapted to mount the spark plug 1 to a combustion apparatus, such as an internal combustion engine or a fuel cell reformer. Also, the metallic shell 3 has, on its outer circumferential surface, a flange-like seat portion 16 projecting radially outward and located rearward of the threaded portion 15. A ring-like gasket 18 is fitted to a screw neck 17 at the rear end of the threaded portion 15. Furthermore, the metallic shell 3 has, near the rear end thereof, a tool engagement portion 19 having a hexagonal cross section and allowing a tool, such as a wrench, to be engaged therewith when the spark plug 1 is to be mounted to the combustion apparatus. Also, the metallic shell 3 has a crimp portion 20, which is bent radially inward and located rearward of the tool engagement portion 19. By means of the crimp portion 20, the ceramic insulator 2 is retained. In the present embodiment, in order to reduce the size of the spark plug 1, the metallic shell 3 is reduced in diameter. Thus, the threaded portion 15 of the metallic shell 3 has a thread diameter of M12 or less.

Additionally, the metallic shell 3 has, on its inner circumferential surface, a tapered, stepped portion 21 adapted to allow the ceramic insulator 2 to be seated thereon. The ceramic insulator 2 is inserted forward into the metallic shell 3 from the rear end of the metallic shell 3. In a state in which the stepped portion 14 of the ceramic insulator 2 butts against the stepped portion 21 of the metallic shell 3, a rear-end opening portion of the metallic shell 3 is crimped radially inward; i.e., the crimp portion 20 is formed, whereby the ceramic insulator 2 is fixed in place. An annular sheet packing 22 intervenes between the stepped portions 14 and 21. This retains gastightness of a combustion chamber and prevents outward leakage of fuel gas entering into a space between the inner circumferential surface of the metallic shell 3 and the leg portion 13 of the ceramic insulator 2, the leg portion 13 being exposed to the combustion chamber.

Furthermore, in order to ensure gastightness which is established by crimping, ring members 23 and 24 intervene between the metallic shell 3 and the ceramic insulator 2 in a region near the rear end of the metallic shell 3, and a space between the ring members 23 and 24 is filled with talc 25. That is, the metallic shell 3 holds the ceramic insulator 2 via the sheet packing 22, the ring members 23 and 24, and the talc 25.

Furthermore, a ground electrode 27 is provided at a forward end portion 26 of the metallic shell 3. The ground electrode 27 has a rectangular section, and a substantially intermediate portion of the ground electrode 27 is bent such that a side surface of a distal end portion of the ground electrode 27 faces a forward end portion of the center electrode 5. The ground electrode 27 is resistance-welded to the metallic shell 3. Also, in order to cope with a reduction in welding area in association with a reduction in diameter of the metallic shell 3, the ground electrode 27 is relatively thin (for example, the sectional area of a proximal end portion is 4.5 $mm^2$ or less). Additionally, a spark discharge gap 33 is formed between a forward end portion of the center electrode 5 and a distal end portion of the ground electrode 27. Spark discharge is performed across the spark discharge gap 33 substantially along the direction of the axis CL1.

Furthermore, in the present embodiment, the ground electrode 27 is formed from a metal material which contains Ni as a main component and in which precipitates containing at least one of an oxide, a carbide, a nitride, and an intermetallic compound are precipitated in grain boundaries. Examples of oxide include yttrium oxide ($Y_2O_3$), zirconium oxide (ZrO), and neodymium oxide ($Nd_2O_3$). Examples of carbide include yttrium dicarbide ($YC_2$) and zirconium carbide (ZrC). Examples of nitride include yttrium nitride (YN) and zirconium nitride (ZrN). Examples of intermetallic compound include Ni—Y, Ni—Nd, Ni—Ho, Ni—Gd, and Ni—Sm. In the present embodiment, the precipitates include any one element of Nd, Y, and Zr.

Figure 2:
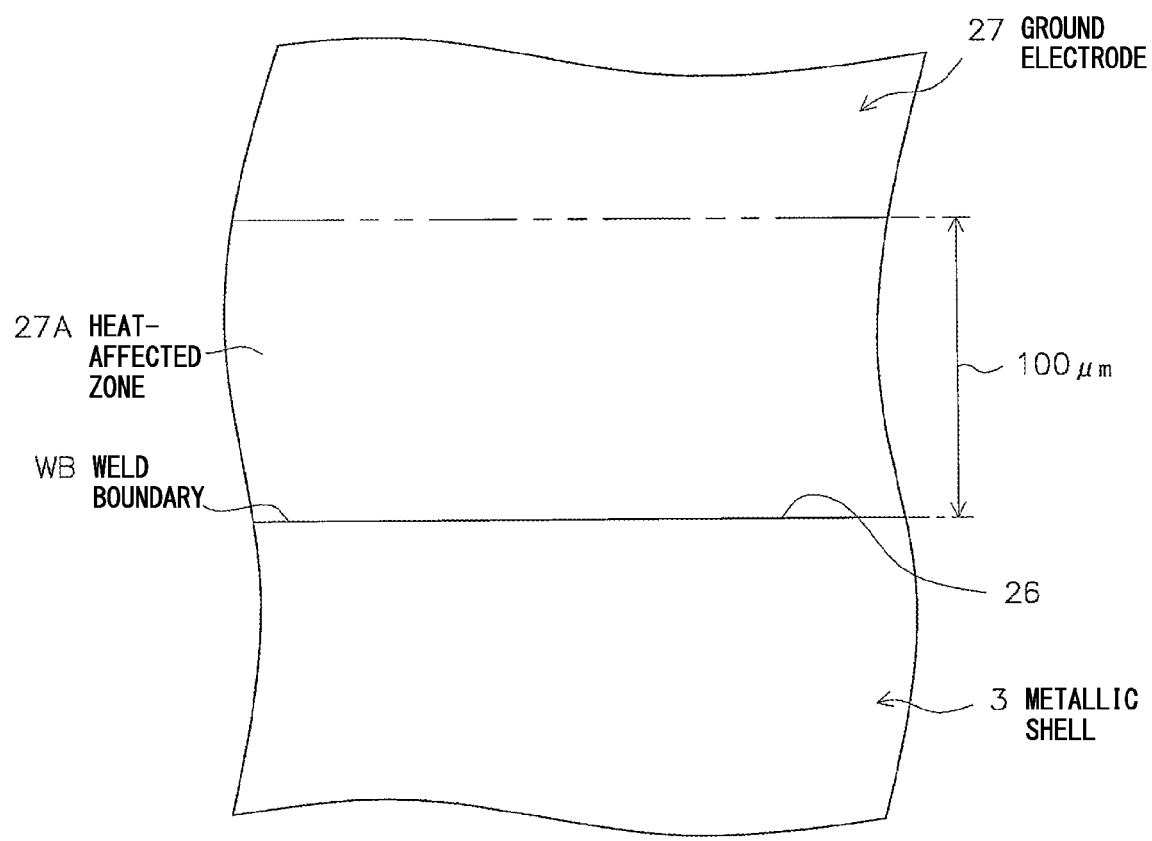
FIG. 2 Enlarged fragmentary side view showing the heat-affected zone, etc., of a ground electrode.
Figure 3:
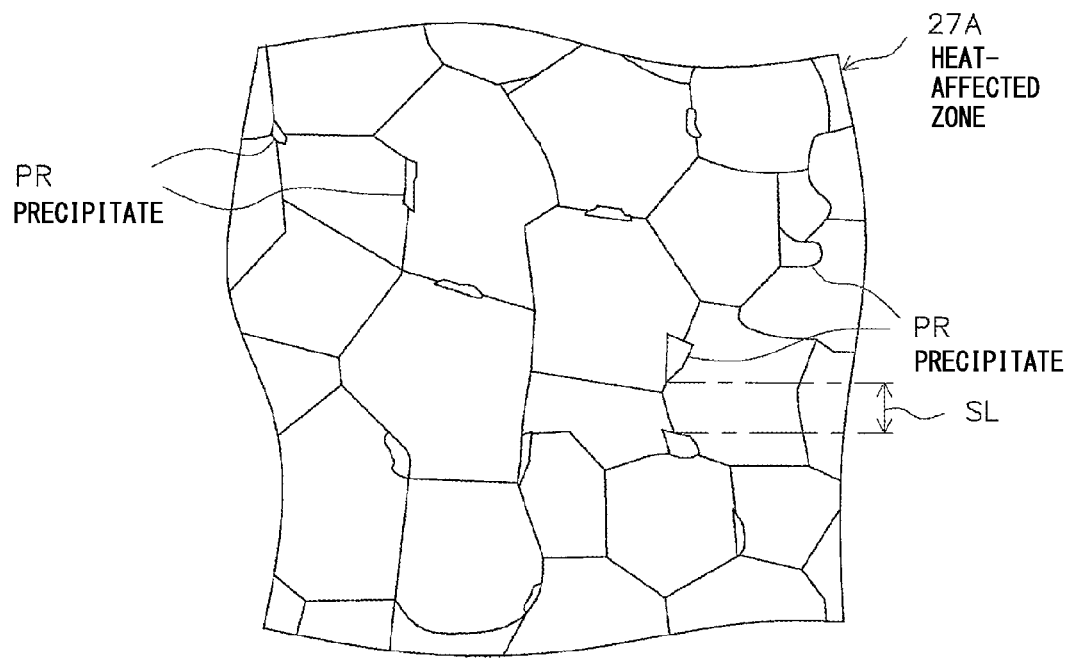
FIG. 3 Enlarged fragmentary side views, wherein (a) shows the internal microstructure of the heat-affected zone, and (b) shows the internal microstructure of a normal zone.
Figure 3:
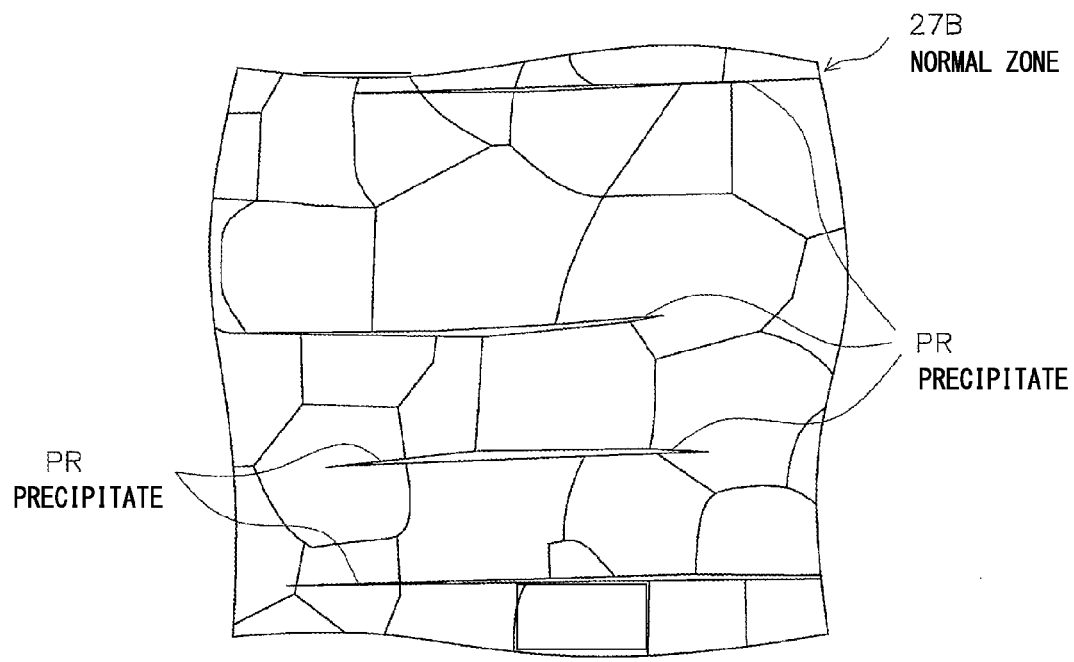

Additionally, the microstructure of the ground electrode 27 is configured as follows. As shown in FIG. 2, a portion of the ground electrode 27 ranging within 100 μm from a weld boundary WB between the metallic shell 3 and the ground electrode 27 (i.e., a portion considered to be greatly affected by heat in resistance welding) is defined as a heat-affected zone 27A, and a distal end portion of the ground electrode 27 (i.e., a portion considered to be little affected by heat) is defined as a normal zone 27B (see FIG. 1). At this time, as shown in FIGS. 3(*a*) and 3(*b*) [FIG. 3(*a*) is an enlarged, fragmentary, sectional view of the heat-affected zone 27A, and FIG. 3(*b*) is an enlarged, fragmentary, sectional view of the normal zone 27B], precipitates PR are precipitated in grain boundaries in the heat-affected zone 27A and the normal zone 27B. The microstructure is configured such that the area occupied by the precipitates PR on the section of the heat-affected zone 27A is equal to 65% or more the area occupied by the precipitates PR on the section of the normal zone 27B. That is, even a portion affected by heat associated with resistance welding has such a microstructure that precipitates are precipitated in a sufficient amount in grain boundaries.

Notably, the condition that "the area occupied by the precipitates PR on the section of the heat-affected zone 27A be equal to 65% or more the area occupied by the precipitates PR on the section of the normal zone 27B" may be replaced with the condition that "the diameter of an equivalent circle of a precipitate PR having the greatest area among the precipitates PR on the section of the heat-affected zone 27A be equal to 85% or more the diameter of an equivalent circle of a precipitate PR having the greatest area among the precipitates PR on the section of the normal zone 27B."

The diameter of an equivalent circle means the diameter of a circle having the same area as the sectional area of a precipitate PR. For example, when the precipitate PR has a sectional area S, the diameter R of an equivalent circle of the precipitate PR is expressed by $R=(4S/\pi)^{1/2}$.

Also, the average grain size of the precipitates PR on a section of the heat-affected zone 27A is rendered smaller than that of the precipitates PR on a section of the normal zone 27B.

Additionally, as shown in FIG. 3(*a*), as viewed on a section of the heat-affected zone 27A, the shortest distance SL between the precipitates PR is rendered 2 μm to 30 μm inclusive. Furthermore, as viewed on the section of the heat-affected zone 27A, the diameter of an equivalent circle of a precipitate PR having the greatest area among the precipitates PR is rendered 50 μm or less.

Next, a method of manufacturing the spark plug 1 configured as mentioned above will be described.

First, the ceramic insulator 2 is formed. For example, a forming material of granular substance is prepared by use of a material powder which contains alumina in a predominant amount, a binder, etc. By use of the prepared forming material of granular substance, a tubular green body is formed by rubber press forming. The thus-formed green body is subjected to grinding for shaping. The shaped green body is subjected to firing in a kiln, thereby yielding the ceramic insulator 2.

Subsequently, the metallic shell 3 is formed beforehand. Specifically, a circular columnar metal material (e.g., an iron-based material, such as S17C or S25C, or a stainless steel material) is subjected to cold forging or the like, thereby forming a through-hole and imparting a general shape. Subsequently, machining or the like is performed so as to adjust the outline, thereby yielding a metallic-shell intermediate.

Furthermore, separately from manufacture of the metallic-shell intermediate and the ceramic insulator 2, the center electrode 5 and the ground electrode 27 are manufactured. Specifically, an Ni alloy is subjected to forging or the like, thereby yielding the center electrode 5. Also, a metal material which contains Ni as a main component and in which an oxide or the like separates out is subjected to forging, thereby yielding the ground electrode 27 in the form of a rod.

Subsequently, the ground electrode 27 in the form of a rod is resistance-welded to the forward end surface of the metallic-shell intermediate. Specifically, while a proximal end portion of the ground electrode 27 is pressed against the forward end surface of the metallic-shell intermediate under a rather large load (e.g., about 800 N), a rather small current (e.g., about 2.0 kA) is applied to a contact region between the ground electrode 27 and the metallic-shell intermediate for a predetermined current application time. At this time, since the pressing load is relatively large, the contact resistance between the ground electrode and the metallic-shell intermediate drops. Thus, coupled with the applied current being small, the amount of heat generation in the contact region can be relatively small. Since the contact region fused by resistance welding is relatively small in the amount of heat generation, the fused contact region gradually cools down and finally solidifies. Thus, the ground electrode 27 is joined to the metallic-shell intermediate. Also, by the influence of heat associated with welding, the average grain size of precipitates on a section of the heat-affected zone 27A of the ground electrode 27 is smaller than that of precipitates on a section of the normal zone 27B.

Furthermore, the welding is accompanied by formation of so-called "sags." After the "sags" are removed, the threaded portion 15 is formed in a predetermined region of the metallic-shell intermediate by rolling. Thus is yielded the metallic shell 3 to which the ground electrode 27 is welded. Furthermore, the surfaces of the metallic shell 3, etc., are subjected to zinc plating or nickel plating. In order to enhance corrosion resistance, the plated surfaces may be further subjected to chromate treatment.

Next, the ceramic insulator 2 and the center electrode 5, which are yielded as mentioned above, the resistor 7, and the terminal electrode 6 are fixed in a sealed condition by means of the glass seal layers 8 and 9. In order to form the glass seal layers 8 and 9, generally, a mixture of borosilicate glass and a metal powder is prepared, and the prepared mixture is charged into the axial bore 4 of the ceramic insulator 2 such that the resistor 7 is sandwiched therebetween. Subsequently, the resultant assembly is sintered, in a kiln, in a condition in which the charged mixture is pressed from the rear by the terminal electrode 6. At this time, a glaze layer may be simultaneously fired on the surface of the rear trunk portion 10 of the ceramic insulator 2; alternatively, the glaze layer may be formed beforehand.

Subsequently, the ceramic insulator 2 having the center electrode 5, etc., formed as mentioned above, and the metallic shell 3 having the ground electrode 27 are fixed together. More specifically, in a state in which the insulator 2 is inserted through the metallic shell 3, a relatively thin-walled rear-end opening portion of the metallic shell 3 is crimped radially inward; i.e., the crimp portion 20 is formed, thereby fixing the ceramic insulator 2 and the metallic shell 3 together.

Finally, the ground electrode 27 is bent toward the center electrode 5, and the magnitude of the spark discharge gap 33 formed between the center electrode 5 and the ground electrode 27 is adjusted, thereby yielding the spark plug 1 described above.

As described above in detail, according to the present embodiment, the ground electrode 27 is formed from a metal material in which precipitates containing at least one of an oxide, a carbide, a nitride, and an intermetallic compound are precipitated in grain boundaries. Thus, the ground electrode 27 can be improved in corrosion resistance, etc.

On the other hand, since a metal material used to form the ground electrode 27 contains precipitates, the ground electrode 27 involves a concern about deterioration in welding strength. However, according to the present embodiment, the area occupied by the precipitates PR on a section of the heat-affected zone 27A is equal to 65% or more the area occupied by the precipitates PR on a section of the normal zone 27B (or the diameter of an equivalent circle of a precipitate PR having the greatest area among the precipitates PR on a section of the heat-affected zone 27A is equal to 85% or more the diameter of an equivalent circle of a precipitate PR having the greatest area among the precipitates PR on a section of the normal zone 27B). That is, the configuration is determined such that the precipitates PR are precipitated sufficiently in the heat-affected zone 27A. Therefore, the precipitates PR can be more reliably prevented from falling in a supersaturated state in the heat-affected zone 27B. As a result, embrittlement of the weld zone (the heat-affected zone 27A and its vicinity) associated with a plating process can be effectively restrained.

Also, as viewed on a section of the heat-affected zone 27A, the diameter of an equivalent circle of a precipitate PR having the greatest area among the precipitates PR is 50 µm or less, and the shortest distance between precipitates is 2 µm or greater. Thus, the propagation speed of cracking, if any, can be effectively lowered, and deterioration in strength of the heat-affected zone 27A can be more reliably prevented.

As described above, according to the present embodiment, embrittlement of the heat-affected zone 27A can be restrained, and deterioration in strength of the heat-affected zone 27A can be more reliably prevented through reduction of the propagation speed of cracking. As a result, the welding strength of the ground electrode 27 can be drastically improved. For the spark plug 1 of the present embodiment; i.e., for the spark plug 1 in which the ground electrode 27 cannot have a sufficient welding area because of the ground electrode 27 being thin, imparting the above-mentioned configuration to the heat-affected zone 27A is particularly effective.

Furthermore, since the distance between the precipitates PR is specified to a sufficiently small value of 30 µm or less, coarsening of crystal grains can be more reliably restrained. As a result, internal corrosion and deterioration in durability of the heat-affected zone 27A can be more reliably prevented.

Next, in order to verify actions and effects to be yielded by the above embodiment, there were manufactured spark plug samples which differed in the following parameters as effected by changing resistance-welding conditions: the ratio of the area occupied by precipitates on a section of the heat-affected zone to the area occupied by precipitates on a section of the normal zone (precipitate area ratio), or the ratio of the diameter of an equivalent circle of a precipitate having the greatest area on a section of the heat-affected zone to the diameter of an equivalent circle of a precipitate having the greatest area on a section of the normal zone (precipitate diameter ratio); the diameter of an equivalent circle of a precipitate having the maximum area on a section of the heat-affected zone (greatest equivalent-circle diameter); and the shortest distance between precipitates on a section of the heat-affected zone (precipitate-to-precipitate distance). The samples were subjected to a tensile test and a post-heating microstructure evaluation test.

The outline of the tensile test is as follows. By use of a predetermined tensile testing machine (Autograph, a product of Shimadzu Corporation), a tensile force was applied to the ground electrodes of the samples. The location of rupture was identified, and the tensile strength (N) upon occurrence of rupture was measured. In the case where rupture occurred at the weld boundary between the metallic shell and the ground electrode or in the vicinity of the weld boundary, the evaluation "Poor" was made, indicating that the welding strength is poor. In the case where rupture occurred in the base metal of the ground electrode rather than at the weld boundary or in the vicinity of the weld boundary, the evaluation "Good" was made, indicating that the welding strength is good.

The outline of the post-heating microstructure evaluation test is as follows. The heat-affected zone was heated at 1,000° C. for 20 hours; then, the grain size number in the heat-affected zone was obtained. The grain size number was obtained according to JIS G0551. Specifically, the heat-affected zone was sectioned at a plurality of locations, and the sections were subjected to etching treatment. Then, the sections were observed through a metallograph to obtain the average number m of crystal grains per mm$^2$. The grain size number was obtained by the formula m=$8 \times 2^G$ (G is the grain size number). In the case where the grain size number was 5 or greater, the evaluation "Good" was made, indicating that grain growth is restrained. In the case where the grain size number is 4 or less, the evaluation "Fair" was made, indicating that restraint of grain growth is somewhat insufficient.

Table 1 shows the results of the tensile test and the results of the post-heating microstructure evaluation test for the samples which differed in the precipitate area ratio. Table 2 shows the results of the tensile test and the results of the post-heating microstructure evaluation test for the samples which differed in the precipitate diameter ratio. In Tables 1 and 2, irrespective of the results of the post-heating microstructure evaluation test, the comprehensive evaluation "Poor" was made for the samples which involved the occurrence of rupture at the weld boundary or in the vicinity of the weld boundary. The comprehensive evaluation "Good" was made for the samples which were free from the occurrence of rupture at the weld boundary or in the vicinity of the weld boundary. The comprehensive evaluation "Excellent" was made for the samples which were free from the occurrence of rupture at the weld boundary or in the vicinity of the weld boundary and which exhibited a tensile strength of 2.0 kN or greater.

The precipitate area ratio, the precipitate diameter ratio, the greatest equivalent-circle diameter, and the precipitate-to-precipitate distance were measured by use of COMP images of a scanning electron microscope (SEM). The scanning electron microscope was set to 1,000 magnifications, and the precipitate area ratio, etc., were measured with respect to precipitates observed within a field of view of 120 µm×90 µm. Additionally, the ground electrodes of the samples were formed from a metal material which contained Ni as a main component, and Ni—Nd as precipitates. Furthermore, the samples were subjected to zinc plating after resistance welding of the ground electrodes. The samples employed the same resistance welding conditions, and two kinds of samples were manufactured; namely, the samples for testing and the samples for measuring the precipitate area ratio, etc.

TABLE 1

| Sample No | Precipitate area ratio | Greatest inscribed-circle diameter | Precipitate to precipitate distance | Evaluation items | | | Comprehensive evaluation |
|---|---|---|---|---|---|---|---|
| | | | | Rupture location | Tensile strength | Post-heating microstructure | |
| 1 | 58% | 10 μm | 27 μm | Poor | 1.8 kN | Fair | Poor |
| 2 | 53% | 15 μm | 23 μm | Poor | 1.7 kN | Fair | Poor |
| 3 | 62% | 18 μm | 18 μm | Poor | 1.5 kN | Fair | Poor |
| 4 | 47% | 30 μm | 22 μm | Poor | 2.2 kN | Fair | Poor |
| 5 | 60% | 60 μm | 20 μm | Poor | 1.7 kN | Fair | Poor |
| 6 | 94% | 55 μm | 10 μm | Poor | 1.6 kN | Fair | Poor |
| 7 | 90% | 49 μm | 1 μm | Poor | 1.5 kN | Fair | Poor |
| 8 | 65% | 25 μm | 12 μm | Good | 1.8 kN | Good | Good |
| 9 | 73% | 41 μm | 21 μm | Good | 1.7 kN | Good | Good |
| 10 | 81% | 47 μm | 18 μm | Good | 1.9 kN | Good | Good |
| 11 | 93% | 22 μm | 2 μm | Good | 1.9 kN | Good | Good |
| 12 | 97% | 40 μm | 5 μm | Good | 1.8 kN | Good | Good |
| 13 | 98% | 36 μm | 15 μm | Good | 2.2 kN | Good | Excellent |
| 14 | 92% | 50 μm | 10 μm | Good | 2.0 kN | Good | Excellent |
| 15 | 85% | 47 μm | 25 μm | Good | 2.2 kN | Good | Excellent |
| 16 | 98% | 50 μm | 8 μm | Good | 2.5 kN | Good | Excellent |
| 17 | 95% | 28 μm | 30 μm | Good | 2.4 kN | Good | Excellent |
| 18 | 95% | 42 μm | 32 μm | Good | 2.5 kN | Fair | Excellent |
| 19 | 95% | 30 μm | 22 μm | Good | 2.3 kN | Good | Excellent |
| 20 | 92% | 27 μm | 20 μm | Good | 2.1 kN | Good | Excellent |
| 21 | 95% | 33 μm | 18 μm | Good | 2.2 kN | Good | Excellent |

TABLE 2

| Sample No | Precipitate diameter ratio | Greatest inscribed-circle diameter | Precipitate to precipitate distance | Evaluation items | | | Comprehensive evaluation |
|---|---|---|---|---|---|---|---|
| | | | | Rupture location | Tensile strength | Post-heating microstructure | |
| 22 | 50% | 10 μm | 27 μm | Poor | 1.8 kN | Fair | Poor |
| 23 | 65% | 15 μm | 23 μm | Poor | 1.7 kN | Fair | Poor |
| 24 | 77% | 18 μm | 18 μm | Poor | 1.5 kN | Fair | Poor |
| 25 | 60% | 30 μm | 22 μm | Poor | 2.2 kN | Fair | Poor |
| 26 | 71% | 60 μm | 20 μm | Poor | 1.7 kN | Fair | Poor |
| 27 | 87% | 55 μm | 10 μm | Poor | 1.6 kN | Fair | Poor |
| 28 | 92% | 49 μm | 1 μm | Poor | 1.5 kN | Fair | Poor |
| 29 | 93% | 22 μm | 2 μm | Good | 1.9 kN | Good | Good |
| 30 | 92% | 40 μm | 5 μm | Good | 1.8 kN | Good | Good |
| 31 | 88% | 47 μm | 25 μm | Good | 2.2 kN | Good | Excellent |
| 32 | 90% | 50 μm | 8 μm | Good | 2.5 kN | Good | Excellent |
| 33 | 90% | 28 μm | 30 μm | Good | 2.4 kN | Good | Excellent |
| 34 | 88% | 42 μm | 32 μm | Good | 2.5 kN | Fair | Excellent |
| 35 | 90% | 30 μm | 22 μm | Good | 2.3 kN | Good | Excellent |
| 36 | 85% | 27 μm | 20 μm | Good | 2.1 kN | Good | Excellent |
| 37 | 90% | 33 μm | 18 μm | Good | 2.2 kN | Good | Excellent |

As is apparent from Tables 1 and 2, in the case of the samples having a precipitate area ratio of less than 65% (samples 1 to 5), the samples having a precipitate diameter ratio of less than 85% (samples 22 to 26), and the samples having a precipitate greatest equivalent-circle diameter in excess of 50 μm (samples 5, 6, 26, and 27) or a precipitate-to-precipitate distance of less than 2 μm (samples 7 and 28), rupture occurred at the weld boundary or in the vicinity of the weld boundary, resulting in an insufficient welding strength of the ground electrodes. Conceivably, this is for the following reasons (A) and (B). (A) Because of a precipitate area ratio of less than 65% or a precipitate diameter ratio of less than 85% (i.e., at the weld boundary and in the vicinity of the weld boundary, i.e., in the heat-affected zone), precipitates failed to sufficiently are precipitated and fell in a supersaturated state in an alloy), the precipitates in the heat-affected zone occluded hydrogen in the course of plating; as a result, the heat-affected zone embrittled, and (B) because of a precipitate greatest equivalent-circle diameter in excess of 50 μm or a precipitate-to-precipitate distance of less than 2 μm, the distance between precipitates became excessively small; as a result, cracking started from a precipitate propagated more quickly along grain boundaries.

By contrast, the samples having a precipitate area ratio of 65% or more or a precipitate diameter ratio of 85% or more, a precipitate greatest equivalent-circle diameter of 50 μm or less, and a precipitate-to-precipitate distance of 2 μm or greater (samples 8 to 21, and 29 to 37) were found to have excellent welding strength without occurrence of rupture at the weld boundary or in the vicinity of the weld boundary. Conceivably, this is for the following reason: by virtue of precipitates being restrained from falling in a supersaturated state, precipitates were restrained from occluding hydrogen in the course of plating, whereby the heat-affected zone could maintain sufficient strength; and, because of implementation of a greatest equivalent-circle diameter of 50 μm or less and a precipitate-to-precipitate distance of 2 μm or greater, the propagation speed of cracking in the heat-affected zone could be lowered.

Additionally, among the samples having excellent welding strength, the samples having a precipitate area ratio of 85% or more and a precipitate-to-precipitate distance of 8 μm or more (samples 13 to 21) and the samples having a precipitate diameter ratio of 85% or more and a precipitate-to-precipitate distance of 8 μm or more (samples 31 to 37) were found to have a tensile strength of 2.0 kN or greater, indicating quite excellent welding strength.

Also, particularly, it was confirmed that the samples having a precipitate-to-precipitate distance of 30 μm or less (samples 8 to 17, 19 to 21, 29 to 33, and 35 to 37) could restrain post-heating grain growth, thereby yielding an excellent effect of restraining internal corrosion or the like.

On the basis of the above test result, in order to implement excellent welding strength for the ground electrode, preferably, the precipitate area ratio is 65% or more or the precipitate diameter ratio is 85% or more, and the precipitate greatest equivalent-circle diameter is 50 μm or less, and the precipitate-to-precipitate distance is 2 μm or greater. Also, in order to further improve welding strength, more preferably, while the precipitate area ratio is maintained at 85% or more, the precipitate-to-precipitate distance is 8 μm or greater, and, while the precipitate diameter ratio is maintained at 85% or more, the precipitate-to-precipitate distance is 8 μm or more.

Furthermore, in order to improve corrosion resistance and durability, preferably, the precipitate-to-precipitate distance is 30 μm or less.

The present invention is not limited to the above-described embodiment, but may be embodied, for example, as follows. Of course, applications and modifications other than those exemplified below are also possible.

(a) In the above embodiment, precipitates contain any one element of Nd, Y, and Zr. However, precipitates may not contain Nd, Y, or Zr.

(b) In the above embodiment, the technical ideas of the present invention is applied to the spark plug 1 of such a type that spark discharge is performed substantially along the direction of the axis CL1 (a so-called parallel electrode type). However, a spark plug type to which the technical ideas of the present invention are applicable is not limited thereto. For example, the technical ideas of the present invention may be applied to a spark plug of such a type that the distal end surface of the ground electrode faces the side surface of the center electrode and that spark discharge is performed along a direction substantially orthogonal to the axis (a so-called lateral discharge type). In such a spark plug, since the radius of curvature of a bent portion of the ground electrode must be relatively small, in the process of bending the ground electrode, a greater stress may be applied to the weld zone between the ground electrode and the metallic shell. Thus, there is more concern about breakage of the ground electrode at the weld zone. However, the application of the technical ideas of the present invention can sufficiently improve the welding strength of the ground electrode and can more reliably prevent breakage of the ground electrode. Therefore, the present invention is particularly effective for a spark plug of a so-called lateral discharge type.

(c) In the above embodiments, the spark discharge gap 33 is formed between the center electrode 5 and the ground electrode 27. However, at least one of the electrodes 5 and 27 may have a noble metal tip of a noble metal alloy (e.g., a platinum alloy or an iridium alloy), thereby forming a spark discharge gap between the noble metal tip provided on one electrode and the other electrode or between the noble metal tips provided on the two electrodes, respectively. In the case where the noble metal tip is provided on a distal end portion of the ground electrode 27, the normal zone 27B of the ground electrode 27 is a region of the distal end portion of the ground electrode 27 which is not affected by heat in a process of providing the noble metal tip.

(d) In the above embodiment, the tool engagement portion 19 has a hexagonal cross section. However, the shape of the tool engagement portion 19 is not limited thereto. For example, the tool engagement portion 19 may have a Bi-HEX (modified dodecagonal) shape [ISO22977:2005(E)] or the like.

DESCRIPTION OF REFERENCE NUMERALS

1: spark plug; 3: metallic shell; 27: ground electrode; 27A: heat-affected zone; 27B: normal zone; and PR: precipitate.

The invention claimed is:

1. A spark plug comprising:
a tubular metallic shell and
a ground electrode resistance-welded at a proximal end portion to the metallic shell;
the ground electrode being formed from a metal material in which precipitates containing at least one of an oxide, a carbide, a nitride, and an intermetallic compound are precipitated in grain boundaries;
the spark plug being characterized in that when a portion of the ground electrode ranging within 100 μm from a weld boundary between the metallic shell and the ground electrode is defined as a heat-affected zone, and a distal end portion of the ground electrode is defined as a normal zone,
an area occupied by the precipitates on a section of the heat-affected zone is equal to 65% or more an area occupied by the precipitates on a section of the normal zone, and
as viewed on the section of the heat-affected zone, a diameter of an equivalent circle of a precipitate having a greatest area among the precipitates is 50 μm or less, and a shortest distance between the precipitates is 2 μm or greater.

2. A spark plug as claimed in claim 1, wherein the area occupied by the precipitates on the section of the heat-affected zone is equal to 85% or more the area occupied by the precipitates on the section of the normal zone, and
as viewed on the section of the heat-affected zone, the diameter of an equivalent circle of the precipitate having the greatest area among the precipitates is 50 μm or less, and the shortest distance between the precipitates is 8 μm or greater.

3. A spark plug according to as claimed in claim 1, wherein as viewed on the section of the heat-affected zone, the shortest distance between the precipitates is 30 μm or less.

4. A spark plug as claimed in claim 1, wherein the precipitates contain any one element of neodymium, yttrium, and zirconium.

5. A spark plug comprising:
a tubular metallic shell and
a ground electrode resistance-welded at a proximal end portion to the metallic shell;
the ground electrode being formed from a metal material in which precipitates containing at least one of an oxide, a carbide, a nitride, and an intermetallic compound are precipitated in grain boundaries;
the spark plug being characterized in that when a portion of the ground electrode ranging within 100 μm from a weld boundary between the metallic shell and the ground electrode is defined as a heat-affected zone, and a distal end portion of the ground electrode is defined as a normal zone, a diameter of an equivalent circle of a precipitate having a greatest area among the precipitates on a section of the heat-affected zone is equal to 85% or more a diameter of an equivalent circle of a precipitate having a greatest area among the precipitates on a section of the normal zone, and as viewed on the section of the heat-affected zone, the diameter of the equivalent circle of the precipitate having the greatest area among the precipitates is 50 µm or less, and a shortest distance between the precipitates is 2 µm or greater.

6. A spark plug as claimed in claim 5, wherein as viewed on the section of the heat-affected zone, the diameter of the equivalent circle of the precipitate having the greatest area among the precipitates is 50 µm or less, and the shortest distance between the precipitates is 8 µm or greater.

7. A spark plug as claimed in claim 5, wherein as viewed on the section of the heat-affected zone, the shortest distance between the precipitates is 30 µm or less.

8. A spark plug as claimed in claim 5, wherein the precipitates contain any one element of neodymium, yttrium, and zirconium.

* * * * *